United States Patent
Schmidt et al.

(10) Patent No.: US 11,438,343 B2
(45) Date of Patent: Sep. 6, 2022

(54) MOTOR VEHICLE HAVING A DATA NETWORK WHICH IS DIVIDED INTO MULTIPLE SEPARATE DOMAINS AND METHOD FOR OPERATING THE DATA NETWORK

(71) Applicant: AUDI AG, Ingolstadt (DE)

(72) Inventors: Karsten Schmidt, Ingolstadt (DE); Felix Friedrich, Munich (DE); Martin Brunner, Munich (DE)

(73) Assignee: AUDI AG, Ingolstadt (DE)

( * ) Notice: Subject to any disclaimer, the term of this patent is extended or adjusted under 35 U.S.C. 154(b) by 487 days.

(21) Appl. No.: 16/485,108

(22) PCT Filed: Feb. 15, 2018

(86) PCT No.: PCT/EP2018/053787
§ 371 (c)(1),
(2) Date: Aug. 9, 2019

(87) PCT Pub. No.: WO2018/158084
PCT Pub. Date: Sep. 7, 2018

(65) Prior Publication Data
US 2020/0045057 A1 Feb. 6, 2020

(30) Foreign Application Priority Data
Feb. 28, 2017 (DE) .................. 10 2017 203 185.9

(51) Int. Cl.
*G06F 21/00* (2013.01)
*H04L 9/40* (2022.01)
(Continued)

(52) U.S. Cl.
CPC ...... *H04L 63/123* (2013.01); *H04L 12/40013* (2013.01); *H04L 12/4641* (2013.01);
(Continued)

(58) Field of Classification Search
None
See application file for complete search history.

(56) References Cited

U.S. PATENT DOCUMENTS 6,430,478 B2    8/2002  Heckmann et al.
9,755,851 B2 *  9/2017  Grimm ................. H04W 4/40
(Continued)

FOREIGN PATENT DOCUMENTS

CN    101659244 A    3/2010
CN    202175006 U    3/2012
(Continued)

OTHER PUBLICATIONS

Performance Analysis of Cluster Formation Method in Vehicular Ad-hoc Networks. Fauziyyah. IEEE. (Year: 2017).*
(Continued)

*Primary Examiner* — Venkat Perungavoor
(74) *Attorney, Agent, or Firm* — Sterne, Kessler, Goldstein & Fox P.L.L.C.

(57) ABSTRACT

The disclosure relates to a motor vehicle having a data network via multiple control devices of the motor vehicle for exchanging message data (that are coupled together, wherein the data network is subdivided into different domains and via each of the domains respectively some of the control devices are coupled to the data network and in each domain respectively other of the control devices are included and the exchange of message data is blocked between the control devices of different domains or permitted only as a function of an authorization check of at least one domain transition is provided. The disclosure provides that the data network also includes an overall domain and each of the control devices is also coupled via the overall domain to the data network.

9 Claims, 1 Drawing Sheet

(51) Int. Cl.
*H04L 12/40* (2006.01)
*H04L 12/46* (2006.01)
*H04L 12/66* (2006.01)
*H04L 9/00* (2022.01)

(52) U.S. Cl.
CPC .......... *H04L 12/66* (2013.01); *H04L 63/0428* (2013.01); *H04L 63/10* (2013.01); *H04L 2012/40273* (2013.01)

(56) References Cited

U.S. PATENT DOCUMENTS

| | | | |
|---|---|---|---|
| 9,774,474 | B2 | 9/2017 | Langer |
| 10,227,053 | B2 | 3/2019 | Ujiie et al. |
| 10,454,848 | B2 | 10/2019 | Armbruster et al. |
| 10,462,069 | B2 | 10/2019 | Kim et al. |
| 10,756,930 | B2 * | 8/2020 | Haga .................. H04L 12/4625 |
| 2006/0180709 | A1 | 8/2006 | Breton et al. |
| 2014/0133350 | A1 * | 5/2014 | Triess ..................... H04L 29/06 370/254 |
| 2015/0172306 | A1 | 6/2015 | Kim et al. |
| 2015/0312378 | A1 * | 10/2015 | Yang ....................... G06F 9/467 709/203 |
| 2016/0182341 | A1 | 6/2016 | Fischer et al. |
| 2016/0328254 | A1 | 11/2016 | Ahmed et al. |
| 2016/0328272 | A1 | 11/2016 | Ahmed et al. |
| 2017/0048223 | A1 | 2/2017 | Padmanaban et al. |
| 2018/0062988 | A1 * | 3/2018 | Sikaria .................... H04L 69/22 |
| 2020/0045057 | A1 | 2/2020 | Schmidt et al. |
| 2020/0169555 | A1 * | 5/2020 | Chung .................. H04L 63/029 |
| 2021/0184885 | A1 * | 6/2021 | Choi ..................... H04L 63/101 |
| 2021/0185070 | A1 * | 6/2021 | Jeon .................... H04L 63/1425 |
| 2021/0250340 | A1 * | 8/2021 | Green .................... G06F 13/42 |

FOREIGN PATENT DOCUMENTS

| | | | |
|---|---|---|---|
| CN | 103458017 | A | 12/2013 |
| CN | 103581061 | A | 2/2014 |
| CN | 103797467 | A | 5/2014 |
| CN | 104184815 | A | 12/2014 |
| CN | 104717202 | A | 6/2015 |
| CN | 105083169 | A | 11/2015 |
| CN | 105579318 | A | 5/2016 |
| CN | 105594155 | A | 5/2016 |
| CN | 105981335 | A | 9/2016 |
| CN | 106427827 | A | 2/2017 |
| DE | 10027006 | A1 | 12/2001 |
| DE | 102007010264 | A1 | 9/2008 |
| DE | 102014207389 | A1 | 10/2015 |
| DE | 102017203185 | A1 | 8/2018 |
| EP | 2892185 | A1 | 7/2015 |
| EP | 3547192 | A1 * | 10/2019 ............ H04L 12/40 |
| KR | 20100136223 | A | 12/2010 |

OTHER PUBLICATIONS

Vehicular Ad Hoc Network (VANET): Enabling Secure and Efficient Transportation System. Gillani. (Year: 2008).*
Car surveillance Security System. Jacob. IEEE. (Year: 2017).*
A Gateway System for an Automotive System: LIN, CAN, and FlexRay. Kim. IEEE. (Year: 2008).*
Gateway Framework for In-Vehicle Networks Based on CAN, FlexRay, and Ethernet. Kim. IEEE. (Year: 2015).*
A Hybrid Approach for Efficient Privacy-Preserving Authentication in VANET. Rajput. IEEE. (Year: 2017).*
Smart Vehicle Management System by using Gateway, Hand-set and VMP. Seo. ICROS. (Year: 2007).*
Security in Vehicular Ad hoc Network by using Multiple Operating Channels. Shukla. IEEE. (Year: 2016).*
M-AODV+: An Extension of AODV+ Routing Protocol for Supporting Vehicle-to-Vehicle Communication in Vehicular Ad hoc Networks. Wantoro. IEEE. (Year: 2014).*
In-Vehicle Networks Outlook: Achievements and Challenges. Zeng. IEEE. (Year: 2016).*
International Search Report and Written Opinion of the International Searching Authority directed to related International Patent Application No. PCT/EP2018/053787, dated Apr. 5, 2018, with attached English-language translation; 18 pages.
International Preliminary Report on Patentability directed to related International Patent Application No. PCT/EP2018/053787, completed Feb. 13, 2019, with attached English-language translation; 11 pages.

* cited by examiner

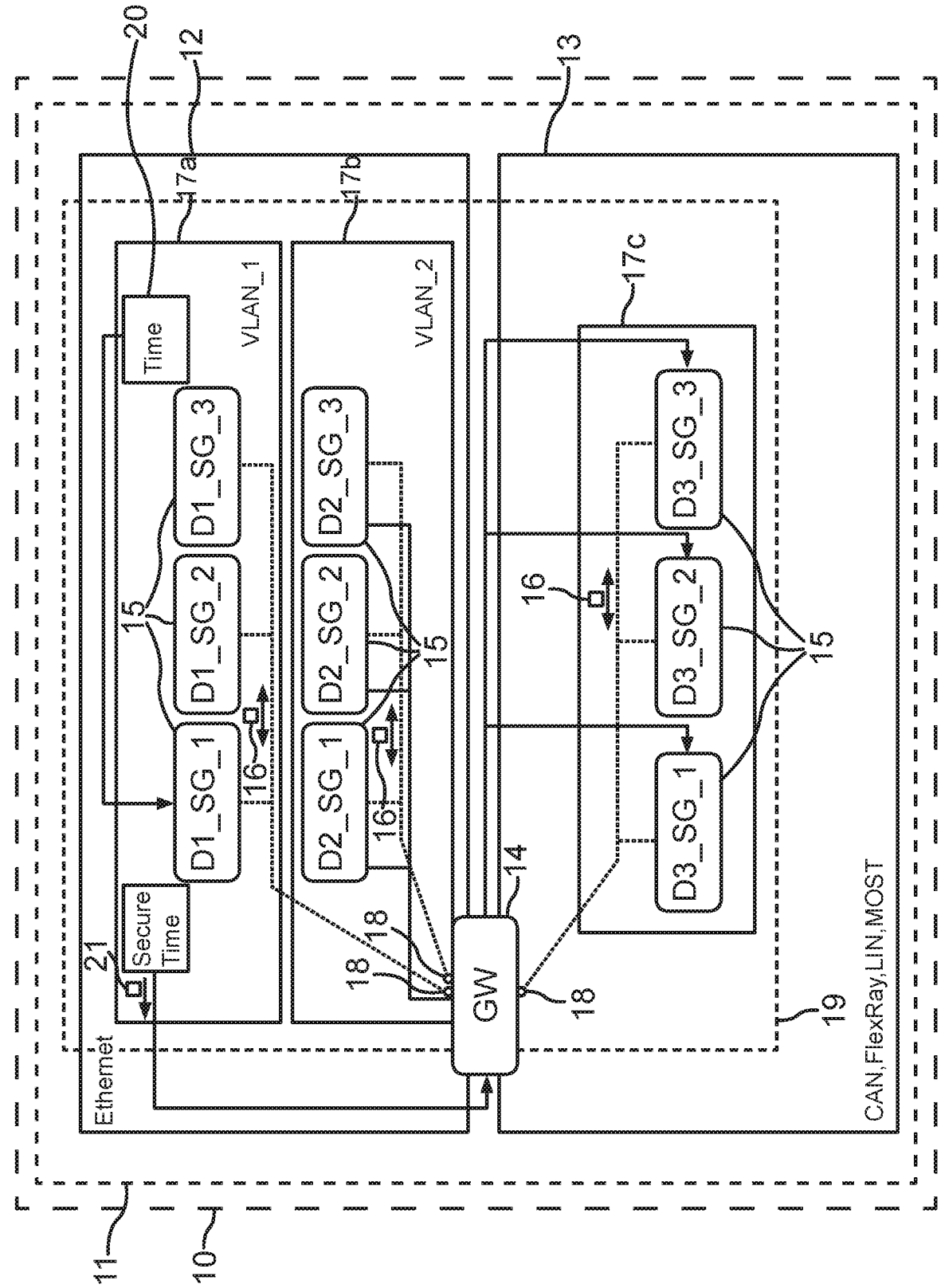

MOTOR VEHICLE HAVING A DATA NETWORK WHICH IS DIVIDED INTO MULTIPLE SEPARATE DOMAINS AND METHOD FOR OPERATING THE DATA NETWORK

The present application is a National Phase Entry of International Application PCT/EP2018/053787, filed Feb. 15, 2018, which claims priority to Germany Patent Application No. 102017203185.9, filed Feb. 28, 2017, all of which are herein incorporated by reference in their entireties.

TECHNICAL FIELD

The present application relates to a motor vehicle having a data network.

BACKGROUND

In terms of circuit technology, it is of interest to design the data network in a motor vehicle as simply and uniformly as possible. In this case, a uniform network technology is advantageous. On the other hand, it is also of interest for reasons of safety to separate control devices from one another in terms of data technology in such a way that, for example, driving safety-relevant control devices cannot be influenced by other control devices if the latter are defective or have been tampered with. In this case, a division of a data network into domains is advantageous, which may be achieved in the prior art, for example, on the basis of various bus technologies. Thus, multiple CAN (Controller Area Network) lines, a FlexRay bus and an Ethernet may be provided, which represent domains separated from one another.

However, such domains have the disadvantage that there are signals or signal data that must be available in multiple domains or even in all domains. This may be general pieces of information such as, for example, the current time, or even functional data of cross-domain functions such as, for example, remote controlled or autonomous parking or vehicle diagnostics. Thus, predetermined general pieces of information must be distributed across domain boundaries. The difficulty lies in distributing these general pieces of information in the data network so that the strict separation of, for example, the driving safety-relevant control devices, or generally selected or predetermined control devices, from the other control devices is maintained and the domain boundaries are not softened by the transmitted general pieces of information or, for example, become surmountable for a hacker. The controlled transmission of message data with general pieces of information beyond domain boundaries or domain transitions may take place for this purpose using a gateway which, however, may cause a transmission latency due to the implementation of the message data through the gateway.

It is known from DE 100 27 006 A1 that a control device in a motor vehicle may be identified via a network, in order in this way to determine its authenticity.

A master device for a diagnosis in a data network of a motor vehicle is known from DE 10 2007 010 264 A1. However, this device does not ensure the security of the data network.

From DE 10 2014 207 389 A1, a method is known as to how message signals of different priority are configured in relation to each other in such a way that when a message with high priority collides with a message of low priority in the data network, the message with high priority is transmitted unaltered. For this purpose, dominant and recessive signal levels are defined in the data network.

BRIEF DESCRIPTION OF THE DRAWINGS

FIG. 1 shows a schematic representation of an embodiment of the motor vehicle according to the application.

DETAILED DESCRIPTION

The present application relates to a motor vehicle having a data network via which multiple control devices of the motor vehicle are coupled to each other for exchanging message data. The application also includes a method for operating the data network.

In terms of circuit technology, it is of interest to design the data network in a motor vehicle as simply and uniformly as possible. In this case, a uniform network technology is advantageous. On the other hand, it is also of interest for reasons of safety to separate control devices from one another in terms of data technology in such a way that, for example, driving safety-relevant control devices cannot be influenced by other control devices if the latter are defective or have been tampered with. In this case, a division of a data network into domains is advantageous, which may be achieved in the prior art, for example, on the basis of various bus technologies. Thus, multiple CAN (Controller Area Network) lines, a FlexRay bus and an Ethernet may be provided, which represent domains separated from one another.

However, such domains have the disadvantage that there are signals or signal data that must be available in multiple domains or even in all domains. This may be general pieces of information such as, for example, the current time, or even functional data of cross-domain functions such as, for example, remote controlled or autonomous parking or vehicle diagnostics. Thus, predetermined general pieces of information must be distributed across domain boundaries. The difficulty lies in distributing these general pieces of information in the data network so that the strict separation of, for example, the driving safety-relevant control devices, or generally selected or predetermined control devices, from the other control devices is maintained and the domain boundaries are not softened by the transmitted general pieces of information or, for example, become surmountable for a hacker. The controlled transmission of message data with general pieces of information beyond domain boundaries or domain transitions may take place for this purpose using a gateway which, however, may cause a transmission latency due to the implementation of the message data through the gateway.

It is known from DE 100 27 006 A1 that a control device in a motor vehicle may be identified via a network, in order in this way to determine its authenticity.

A master device for a diagnosis in a data network of a motor vehicle is known from DE 10 2007 010 264 A1. However, this device does not ensure the security of the data network.

From DE 10 2014 207 389 A1, a method is known as to how message signals of different priority are configured in relation to each other in such a way that when a message with high priority collides with a message of low priority in the data network, the message with high priority is transmitted unaltered. For this purpose, dominant and recessive signal levels are defined in the data network.

The object of the application is to separate groups of control devices from each other in a data network of a motor vehicle and to still effectively and securely enable the distribution of message data with general pieces of information, which are to be distributed across domains.

The object is achieved by the subject matters of the independent claims. Advantageous refinements of the application are described by the features of the dependent claims, the following description, and the drawings.

The application provides a motor vehicle that includes a data network. Multiple control devices of the motor vehicle are coupled to each other via the data network for exchanging message data. Such message data may include, for example, at least one sensor signal of a sensor and/or at least one control command for an actuator and/or at least one state value of a control device. The data network is divided or subdivided into different domains. Each of the domains has some of the control devices coupled to the data network. The domains are preferably non-overlapping, that is, each of the control devices is coupled to only one of the domains. Each of the domains therefore contains different control devices. For example, a domain may be defined by an address space, i.e., a respective set of valid device addresses for sending and/or receiving message data. Thus, the exchange of messages between the control devices within each domain is unobstructed. In other words, in a domain, a control device coupled to that domain may provide message data directly to any other control device within the domain. Direct in this case means that a switch may optionally be provided between the control devices, but which leaves unchecked the content of the message data. By contrast, the exchange of message data between different domains is completely blocked or permitted only as a function of an authorization check provided at least one domain transition. Such an authorization check may be, for example, a routing, which checks predetermined routing rules that specify which control device of one domain may send or transmit to which other control device in at least one other domain. Thus, because of this subdivision into domains, only control devices within their respective domain may exchange message data with each other in an unobstructed manner. This enables the separation of control devices as described. Thus, for example, driving safety-relevant control devices may be separated from control devices, for example, consumer electronics, by being coupled into different domains.

In order to be able to distribute or send message data with general pieces of information across domains, the data network also includes an overall domain and each of the control devices is also coupled via the overall domain to the data network. The overall domain may therefore be an additional address space. Each control device may then include, for example, two device addresses for sending and/or receiving message data, one for the domain and one for the overall domain. In the overall domain, however, preferably only one of the control devices transmits, as will be explained further below. A control device may thus receive message data either from its own domain or from the overall domain. Since each of the control devices is coupled in the overall domain, message data may be exchanged in an unobstructed manner between control devices via the overall domain, i.e., directly or via a switch or as a broadcast or as a multicast. Thus, to transmit message data from one control device of one domain to a control device of another domain, no domain transition between the two domains need be surmounted, so that, for example, a routing or gateway is unnecessary or an authorization check in general. Instead, cross-domain message data may be transmitted across the overall domain directly from one control device to the other control device, i.e., in an unobstructed manner, without an authorization check within the overall domain. The domains thus represent a subnetwork, the overall domain extends across multiple of these domains as an overarching overall network.

The application provides the advantage that the domains may be completely separated from one another, i.e., the transmission of message data between different domains at domain boundaries or domain transitions may be completely blocked and, instead, message data that is to be distributed across domains may be transmitted to any control device via a separate domain, namely, the overall domain. This message data may therefore be sent as domain-internal data traffic within the overall domain. The statement that "all of the control devices" are combined in the overall domain is to be understood to mean that other control devices that are not part of the overall domain may also be present in the motor vehicle. For the description of the application, only the group of those control devices of the motor vehicle is considered here, which are also included in the overall domain.

The application also includes refinements, the features of which result in additional advantages.

The division of the data network into domains is preferably purely logical. In this case, at least part of the data network may be an Ethernet network. Each domain of the Ethernet network and the part of the overall domain comprising the Ethernet network are each configured as a Virtual Local Area Network (VLAN) of the Ethernet network. The overall domain and the respective domains into which the data network is subdivided may transmit their respective message data in a shared physical data network, i.e., on shared physical data lines. Nevertheless, the domains do not influence each other nor the overall domain as a result of the logical separation by means of VLAN. The separation is based on the MAC addresses (MAC-Media Access Control) and/or IP addresses (IP-Internet Protocol), so that each message may be uniquely assigned to one domain or to the overall domain. The division into domains and the definition of the overall domain may be done by programming or configuring switches.

So that the control devices are unable to influence each other unintentionally within the overall domain, for example, due to a defect or tampering, it is preferably provided that a unidirectional communication from a transmission-authorized control device to the other control devices is provided in the overall domain. In particular, only a single control device is authorized to transmit. This is also referred to below as SIM (Secure Interdomain Master). In order to ensure that message data transmitted nevertheless in the overall domain by one of the other control devices (for example, due to the defect or tampering) continues to have no influence on the other control devices, the rest of the control devices in the overall domain accept only such message data as valid if this message data has been transmitted by the transmission-authorized control device. Message data from any other control device is therefore ignored or at least classified as invalid.

In order to render a check of the sender of the message data in the overall domain tamper-proof for the other control devices, it is preferably provided that the transmission-authorized control device is configured to carry out a cryptographic signing and/or an encryption of the message data transmitted by it. A signing and/or an encryption, which may be checked by the other control devices, may be achieved, for example, on the basis of an asymmetrical encryption (public key/private key method). A signing in this case provides that the message data are transmitted unencrypted, but a cryptographically encrypted checksum is also transmitted as a signature. Alternatively, the (complete) encryption of the message data itself may be provided. Other control devices then accept only message data from the overall domain that are successfully decrypted and/or verified based on a cryptographic checksum.

Thus, just one single control transmission-authorized control device serves as a message distributor. The transmission-authorized control device is preferably configured to receive respective message data from multiple of the domains and to transmit it to at least one of the other control devices via the overall domain. Thus, if a first control device wishes to send out or distribute message data to at least one other, second control device that is not located in the same domain, the first control device may then transmit the message data to the transmission-authorized control device, i.e., to the SIM, which may then distribute or forward this message data via the overall domain to the at least one other, second control device.

A particular advantage results when the transmission-authorized control device forwards or transmits the message data to multiple other control devices via the overall domain. In this case, the transmission-authorized control device is preferably configured to carry out a predetermined plausibility check and/or integrity check and/or authenticity check on the received message data. This results in the advantage that the respective test need be carried out only once by the transmission-authorized control device and not by each of the other control devices that receive the message data via the overall domain. The plausibility check in this case may provide a check as to whether a value signaled in the message data, for example, a sensor value, such as a temperature or a steering angle, is within a predetermined value interval. Otherwise, the value is implausible. An integrity check may provide for a transmission authorization of the control device transmitting the message data to the transmission-authorized control device. In this way, it may be ensured that the message data are provided only by a control device authorized for this purpose. An authenticity check may provide that the authenticity of an identity, which indicates the transmission of the control device when the message data is generated, actually identifies the control device. If someone connects an additional control device to one of the domains and uses it to transmit message data while indicating a false identity or false sender address, this may then be detected by the authenticity check.

The transmission-authorized control device need not be identical to a gateway, via which the different domains are separated from one another. The transmission-authorized control device may thus be different from a gateway, which forms the domain transition between the domains. In this case, the gateway is then preferably configured to forward message data of one of the other control devices, which is located in one of the other domains, to the transmission-authorized control device unchecked. This avoids latency when checked by the gateway. Since the described check for plausibility and/or for integrity and/or for authenticity are carried out in the transmission-authorized control device, no additional, unnecessary check need take place in the gateway. The transmission-authorized control device may also include a firewall for its own protection and for the protection of the overall domain.

The general information for the control devices, i.e., a piece of information for control devices of different domains, may be provided in the motor vehicle in the manner described by means of the transmission-authorized control device and the overall domain. The transmission-authorized control device is adapted, in particular, to receive from a respective one of the other control devices time signal data of a timer unit (for example a clock) and/or speed data of a driving speed of the motor vehicle and/or steering angle data of a steering angle of the motor vehicle and/or network management data of the data network, and to distribute, forward, or transmit them to at least some of the other control devices via the overall domain. The control devices may be synchronized by means of the time signal data. The coupling of the control devices to the data network may be controlled by means of the network management data. A cross-domain functionality, such as driver assistance, may be provided by means of the speed data and the steering angle data.

The fact that the domains may now be consistently or completely separated from each other by blocking or at least by controlling the traffic at the domain transitions, makes it possible to also particularly securely decouple the data network from a non-vehicle data source such as a mobile terminal coupled by means of Bluetooth (for example, a smartphone) and/or an Internet server. A decoupling of data from at least one vehicle-external data source is possible by coupling the at least one vehicle external data source via at least one additional domain to the data network. A WLAN router and/or a Bluetooth transponder and/or a mobile radio module may each be managed as a separate domain, for example.

The motor vehicle according to the application is preferably designed as a car, in particular as a passenger car or truck.

The method according to the application results from the operation of the described data network in the motor vehicle. Thus, multiple control devices exchange message data with each another via the data network and for this purpose are coupled by the data network. The data network in this case is operated subdivided into different domains, for example, by providing multiple VLANs, each of which represents a domain. In each of the domains, respectively some of the control devices are coupled to the data network. In the case of a VLAN, the control device is therefore signed in or registered in the respective Ethernet subnet of the VLAN. Each domain in this case contains other control devices, respectively. The exchange of message data between the control devices within each domain is unobstructed, as it is known in the VLAN in an Ethernet. The exchange of message data between different domains is either blocked or at least permitted only as a function of an authorization check provided at least one domain transition. The cross-domain exchange of message data is instead achieved according to the application by the fact that the data network also includes an overall domain and each of the control devices is also coupled in the overall domain to the data network. Thus, one control device may be coupled, for example, in two different VLANs, namely in its own domain and in the overall domain. For this purpose, the control device may, for example, have or use two different IP addresses (IP Internet Protocol) for sending and/or receiving message data.

The application also includes refinements of the method according to the application, which include features as were previously described in connection with the refinements of the motor vehicle according to the application. For this reason, the corresponding refinements of the method according to the application are not described herein again.

An exemplary embodiment of the application is described below. For this purpose, the sole FIGURE (FIG. 1) shows a schematic representation of an embodiment of the motor vehicle according to the application.

The exemplary embodiments explained below are preferred embodiments of the application. In the exemplary embodiments, the described components of the embodiments each constitute individual features of the application to be considered independently of one another, each of which independently further refines the application, and are therefore also to be considered as part of the application individually or in a combination different from that shown. Additional of the previously described features of the application may also be added to the embodiments described.

The FIGURE schematically shows a motor vehicle 10, which may be, for example, a car, in particular, a passenger car or truck. The motor vehicle 10 may include a data network 11, which may include an Ethernet network 12 (Ethernet) and optionally a data bus 13, which may comprise one or multiple different bus technologies such as, for example, CAN, FlexRay, LIN (Local Interconnect Network). and/or MOST (Media Oriented Systems Transport). The Ethernet 12 and the bus system 13 may be coupled or connected to each other via a gateway 14 (GW). Control devices 15 may exchange message data 16 with each other by means of the data network 11. This ensures that not every control device 15 is able to reach every other control device 15 with its message data 16 and is thereby able to potentially adversely affect the operation of the other control device 15. For this purpose, the data network 11 is subdivided into domains 17a, 17b, and 17c, which may be effected within the Ethernet network 12 by a respective VLAN (VLAN_1, VLAN 2). A data bus of the motor vehicle 11 may in each case represent a domain 17a, 17b, or 17c. Domain boundaries or domain transitions 18 may each be formed by the gateway 14.

The control devices are distinguished from one another by designations, which indicate the respective domain (D1, D2, D3), such as the domain 17a, 17b, or 17c, and within the respective domain 17a, 17b, or 17c an ordinal number of the control device (SG 1, SG 2, SG 3).

In the motor vehicle 10, an additional overall domain 19 is formed in its data network 11, in which one of the control devices 15, which is referred to here as SIM (Security Interdomain Master), and which represents a transmission-authorized control device in the overall domain 19, is allowed to transmit. Here, it is indicated by way of example that one of the control devices 15 generates a time signal "Time" for synchronizing the control devices 15 and sends corresponding time signal data 20 to the transmission-authorized control device SIM. The transmission-authorized control device SIM may check the time signal data 20 of the time signal "Time" or generally the received message data, for example, for plausibility and/or for integrity and/or for authenticity) and then transmit them in the overall domain 19 to the other control devices 15 as checked message data 21. For example, the gateway 14 may transmit the checked message data 21 ("Secure Time") into the respective domains 17a, 17b, and 17c, i.e., to the VLAN of the Ethernet 12 and into the data bus 13. In the data bus 13, the message data 21 may be transmitted, for example, as a broadcast.

The SIM is therefore a safety anchor in the vehicle network and merges certain data available throughout the vehicle network. It may also check the plausibility of this data. Additional measures for ensuring authenticity and integrity are also possible for all message data sent here. These measures are then distributed to all other recipients via a special VLAN. Only the SIM may write in this VLAN. Thus, no routing between VLAN is necessary, the GW may operate a simple switching after checking the integrity of a frame or message data in general. It is irrelevant that the time signal is also distributed unsecured within the VLAN_1 and the control devices regularly validate this signal only on the basis of the SIM or whether, as shown in the image, they receive only the signal from SIM.

The resulting technical advantages are in particular:

Providing a standard set of general pieces of information in the vehicle network.

No complicated routing between different VLANs for general pieces of information needed by many control devices.

Because no routing between VLANs is necessary, latency requirements for these general pieces of information may be more easily met.

Clear decoupling of traffic entering the vehicle from the outside and actions triggered by it in the vehicle.

Validation of critical signals.

If the data are being modified by a corrupted SG or switch on the transport path, it could be relatively precisely determined where this occurred, since each switch and each SG is able to verify the integrity of the data.

This is achieved in particular by the following features:

Unidirectional connection in the SIM VLAN (overall domain).

Only from the SIM to a signal receiver (other control device).

Only SIM must be hardened to a particular extent in terms of technical and process engineering.

SIM is the central control device, which performs a cryptographic integrity assurance of its sent message data.

SIM knows a part of the application logic and is thus able to validate the plausibility of the received signals in a predefined frame.

In the best case, SIM has additional measured values, with which it is able to additionally adjust the signals.

SIM may also have a particularly secure firewall. Thus, if the SIM is operating in a VLAN other than the signal generator, the GW may forward message data to it without checking or with little checking. Otherwise, the time advantage would be lost here again.

On the whole, the examples show how the application is able to provide a Security Interdomain Master (SIM) in an Ethernet-based vehicle data network.

The invention claimed is:

1. A motor vehicle comprising a data network that is subdivided into a first domain and a second domain defined by respective address spaces, the data network comprising:
   a first controller coupled to the data network via the first domain;
   a second controller coupled to the data network via the second domain, each of the first and second controllers configured to exchange message data with other coupled controllers;
   a gateway configured to form domain transitions by:
      blocking an exchange of message data between the controllers of different domains, or
      permitting the exchange of message data if a function of an authorization check of at least one domain transition is provided;
   an overall domain defined by an additional address space, wherein each of the first and second controllers is coupled to the data network via the overall domain; and a transmission-authorized controller configured to unidirectionally communicate to the first or second controller in the overall domain, wherein the first or second controller accepts message data only from the transmission-authorized controller in the overall domain.

2. The motor vehicle according to claim 1, wherein at least a part of the data network that includes the first domain and a part of the overall domain is an Ethernet network and the first domain and the part of the overall domain are each designed as a VLAN.

3. The motor vehicle according to claim 1, wherein the transmission-authorized controller is configured to carry out a cryptographic signing or an encryption of the message data.

4. The motor vehicle according to claim 1, wherein the transmission-authorized controller is configured to receive respective message data from the first and second domains and to transmit them via the overall domain to at least a third controller coupled to the data network via a third domain.

5. The motor vehicle according to claim 4, wherein the transmission-authorized controller is configured to perform a predetermined plausibility check or an integrity check or an authenticity check on the respective message data.

6. The motor vehicle according to claim 1, wherein the transmission-authorized controller is different from the gateway, and the gateway is configured to transmit message data of the first controller from the first domain and the second controller from the second domain to the transmission-authorized controller unchecked.

7. The motor vehicle according to claim 1, wherein the transmission-authorized controller is configured to receive time signal data of a timer unit or speed data of a driving speed of the motor vehicle or steering angle data of a steering angle of the motor vehicle or network management data of the data network from the first controller, and to distribute them to at least the second controller via the overall domain.

8. The motor vehicle according to claim 1, wherein data from at least one vehicle-external data source is decoupled from the first and second domain by coupling to the data networking via an additional domain.

9. A method for operating a data network of a motor vehicle, wherein the data network is subdivided into a first domain and a second domain defined by respective address spaces, the method comprising:
coupling, via the first domain, a first controller to the data network; coupling, via the second domain, a second controller to the data network,
wherein each of the first and second controllers is configured to exchange message data with other coupled controllers;
forming domain transitions, by a gateway, by performing:
blocking an exchange of message data between the controllers of different domains, or
permitting the exchange of message data if a function of an authorization check of at least one domain transition is provided;
coupling, via an overall domain defined by an additional address space, each of the first and second controllers to the data network; and
communicating, by a transmission-authorized controller, unidirectionally to the first or second controller, wherein the first or second controller accepts message data only from the transmission-authorized controller.

* * * * *